US006662882B2

(12) United States Patent
Hansson

(10) Patent No.: US 6,662,882 B2
(45) Date of Patent: Dec. 16, 2003

(54) POWER NUT RUNNER WITH TORQUE RESPONSIVE POWER SHUT-OFF CAPACITY

(75) Inventor: Gunnar Christer Hansson, Stockholm (SE)

(73) Assignee: Atlas Copco Tools AB, Nacka (SE)

( * ) Notice: Subject to any disclaimer, the term of this patent is extended or adjusted under 35 U.S.C. 154(b) by 69 days.

(21) Appl. No.: 09/750,845

(22) Filed: Dec. 28, 2000

(65) Prior Publication Data

US 2001/0004940 A1 Jun. 28, 2001

(30) Foreign Application Priority Data

Dec. 28, 1999 (SE) .............................................. 9904793

(51) Int. Cl.[7] ................................................ B23Q 5/00
(52) U.S. Cl. ........................ 173/178; 173/176; 192/150
(58) Field of Search ................... 173/178, 176; 192/150

(56) References Cited

U.S. PATENT DOCUMENTS

| | | | | |
|---|---|---|---|---|
| 3,608,686 A | * | 9/1971 | Martin et al. ................ | 192/150 |
| 4,019,589 A | * | 4/1977 | Wallace ....................... | 173/178 |
| 4,231,270 A | * | 11/1980 | Totsu ........................... | 192/150 |
| 4,601,351 A | * | 7/1986 | Hartwig et al. ............. | 173/117 |
| 4,614,134 A | * | 9/1986 | Bohle .......................... | 173/178 |
| 4,721,169 A | * | 1/1988 | Nagasawa et al. .......... | 173/178 |
| 4,838,364 A | * | 6/1989 | Hansson ...................... | 173/170 |
| 5,201,374 A | * | 4/1993 | Rahm .......................... | 173/176 |
| 5,346,023 A | * | 9/1994 | Takagi et al. ................ | 173/109 |
| 5,553,675 A | * | 9/1996 | Pitzen et al. ................. | 173/217 |
| 5,651,419 A | * | 7/1997 | Holzer et al. ............... | 173/183 |
| 5,778,989 A | * | 7/1998 | Neumaier .................... | 173/178 |
| 5,868,208 A | * | 2/1999 | Peisert et al. ................ | 173/110 |

* cited by examiner

Primary Examiner—Rinaldi I. Rada
Assistant Examiner—Louis Tran
(74) Attorney, Agent, or Firm—Frishauf, Holtz, Goodman & Chick, P.C.

(57) ABSTRACT

A power nut runner with a torque responsive shut-off capacity includes a housing (11,12,13), and a rotation motor (10) connected to an output shaft (28) via a torque responsive release clutch (26) in which torque is transferred via a cam mechanism (31, 35, 36) between a driving clutch half (25) and a driven clutch half (27, 30, 39). A spring (32) is arranged to bias and displace a first one of the clutch halves (27, 30, 39) towards the other in an engagement direction, and a signal emitting release detecting sensor (46), is provided in the housing (11, 12, 13). An activation element (40) is arranged to be thrown off an abutting contact with the spring biassed clutch half (27, 30, 39) to reach an active position beyond its inactive low torque position as the spring biassed clutch half (27, 30, 39) is abruptly returned to its engagement position after an axial release movement.

23 Claims, 3 Drawing Sheets

POWER NUT RUNNER WITH TORQUE RESPONSIVE POWER SHUT-OFF CAPACITY

FIELD OF THE INVENTION

The invention relates to a power nut runner of the type comprising a rotation motor for driving an output shaft via a torque responsive release clutch including a driving clutch half, a driven clutch half, and a cam mechanism for transferring torque between the driving clutch half and the driven clutch half, wherein a first one of the driving and driven clutch halves is axially movable by the cam mechanism in a release direction from an engagement position to a release position, wherein a spring is arranged to bias and displace the first clutch half in an engagement direction, and wherein a clutch release detecting device is provided which is cooperative with the movable first clutch half.

RELATED ART

In prior art nut runners of the above type, described for instance in U.S. Pat. Nos. 4,838,364 and 5,201,374, there are provided clutch release detecting devices including an activation rod extending axially through the rotor of the motor. Since the activation rod is not rotationally locked to the rotor, there will always be a difference in speed between the rod and the rotor which inevitably results in a frictional wear of the rod. Moreover, in most tools of this type there is employed a speed reduction gearing between the motor and the clutch, which means that there is also a difference in speed between the rotor and the activation rod support point on the clutch. This amplifies the problem of frictional wear of the rod, and despite an adequate surface hardening of the rod, there is still a problem with a limited service life of the device.

In U.S. Pat. No. 4,231,270, there is described a power screw driver in which a micro switch is actuated by one part of a torque limiting clutch provided between the ring gear of a planetary reduction gearing and the tool housing. This concept, however, is less advantageous in that the release detecting switch is activated by a clutch which is not an in-line clutch, i.e. the clutch does not transfer the driving torque. This results in a slower and less accurate release action and release detection.

In U.S. Pat. No. 3,608,686, there is described a torque responsive in-line clutch with an overload detecting microswitch intended for preventing damage on machine tool parts by initiating disconnection of a drive motor. A disadvantage inherent in this device is that there is an indistinct action of the switch due to a rather short and slow axial release movement of the clutch part. This results in a less accurate release detecting signal. Another disadvantage of this known device is the continuous sliding action between the stationary micro-switch arm and the rotating clutch, which inevitably results in a frictional wear of these parts.

A disadvantage also relating to the clutch operated switch shown in U.S. Pat. No. 4,231,270 resides in the fact that the release movement of the clutch is rather short and that the switch has to be activated somewhere during that movement. Due to this short activation movement, the switch has to be very carefully adjusted to ensure a proper activation. This makes the release detecting and power shut-off mechanism rather sensitive and less reliable.

OBJECT OF THE INVENTION

The primary object of the invention is to accomplish a power nut runner by which the above mentioned problems are avoided by providing a torque transferring clutch with a release detecting device which provides a distinct and prompt power shut-off initiating movement.

Further objects and advantages of the invention will appear from the following specification and claims.

A preferred embodiment of the invention is below described in detail with reference to the accompanying drawing figures.

DETAILED DESCRIPTION

Figure 1:
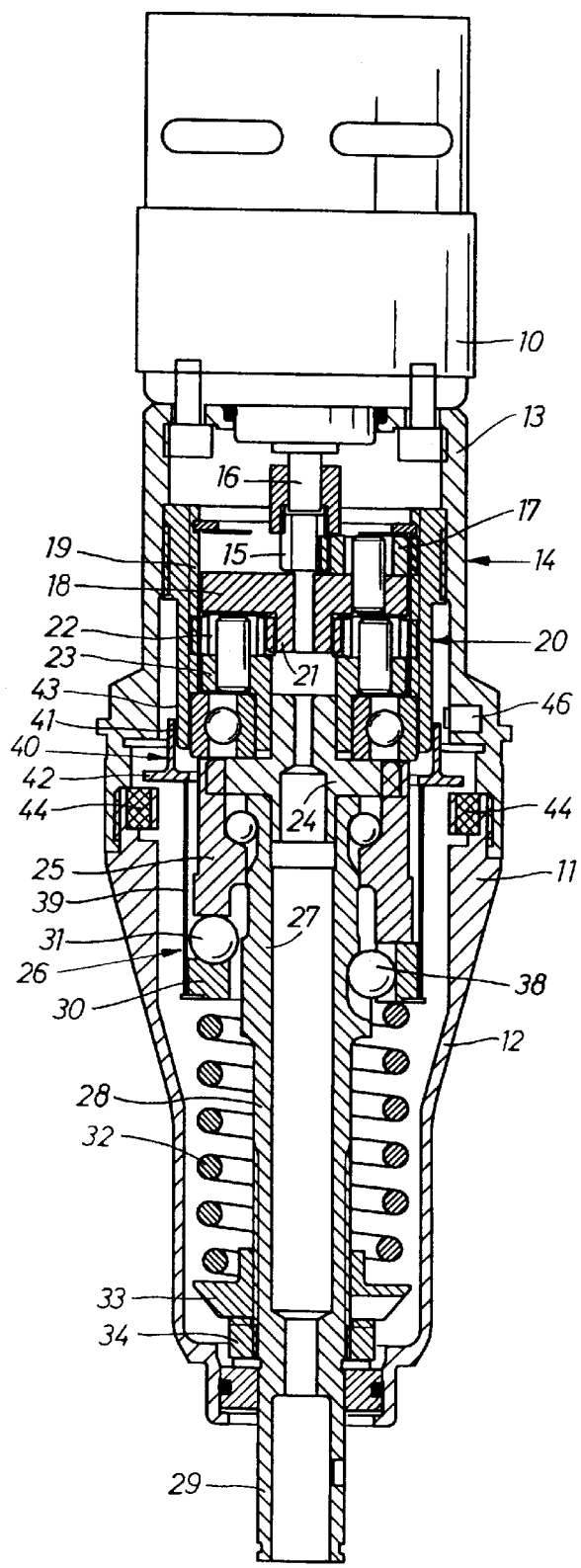
FIG. 1 shows a side view, partly in section, of a power nut runner according to the invention.

The power nut runner shown in FIG. 1 comprises a battery powered electric motor 10 controlled by a manually operated on/off switch (not shown) and an automatically operated shut off switch (not shown).

The nut runner further comprises a housing 11 divided into a forward section 12 and a rear section 13. In the rear section 13, there is located a double planetary type reduction gearing including a first stage 14 with a sun gear 15 rotated by the output spindle 16 of the motor 10, a number of planet wheels 17 journalled on a planet wheel carrier 18, and a ring gear 19 secured in the housing 11. A second stage 20 includes a sun gear 21 formed on the planet wheel carrier 18, a number of planet wheels 22 journalled on a planet wheel carrier 23 and engaging the ring gear 19 which, accordingly, is common to both gearing stages. As illustrated in FIG. 1, the planet wheel carrier 23 of the second stage 20 is connected via a coupling member 24 to a driving clutch half 25 of a torque responsive release clutch 26.

Figure 3A:
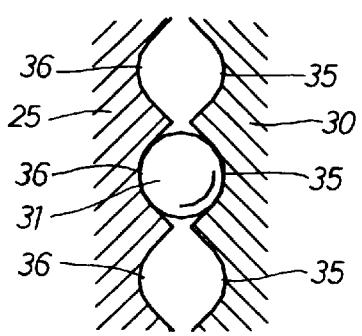
FIG. 3a shows schematically and on a larger scale a fractional view of the torque transferring balls and clutch pockets in their low torque transferring positions.
Figure 3B:
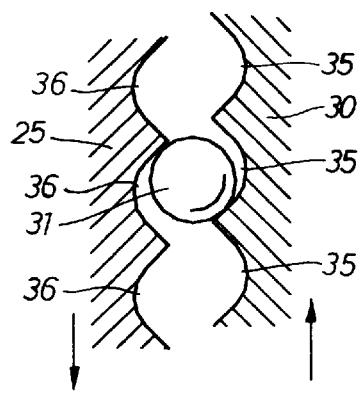
FIG. 3b shows the view in FIG. 3a, but illustrates the beginning of the release displacement of the clutch.
Figure 3C:
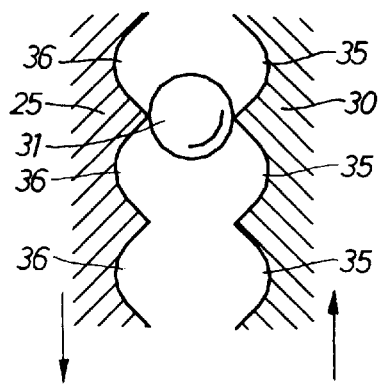
FIG. 3c shows the view in FIG. 3a, but illustrates the fully released position of the clutch.

The release clutch 26 also comprises a driven clutch half 27 which is formed integrally with the output shaft 28 and the screw bit attachment 29 of the nut runner. The driven clutch half 27 includes an annular thrust element 30, a number of torque transferring balls 31, a bias spring 32 for pre-loading the thrust element 30 onto the balls 31, and an adjustable spring support 33. The latter is axially supported by a ring nut 34 threadingly engaging the output shaft 28. The thrust element 30 as well as the driving clutch half 25 are provided with pockets 35 and 36, respectively, for receiving the balls 31 and for transferring torque between the clutch halves 25 and 27, in a conventional way. The pockets 35, 36 are formed with slanted side walls which together with the balls 31 accomplish an axial displacement of the thrust element 30 as the clutch halves 25, 26 are rotationally displaced relative to each other at a certain predetermined torque load. See FIGS. 3a–c.

Moreover, between the driven clutch half 27 and the thrust element 30 there is provided a ball spline connection 38 for enabling a simultaneous torque transfer and axial displacement between the thrust element 30 and the driven clutch half 27.

The thrust element 30 is provided with a sleeve member 39 which extends rearwardly from the thrust element 30 into an abutting engagement with an activation element 40. The latter is made of steel and comprises a rearwardly extending sleeve portion 41 and a flange portion 42. The sleeve portion 41 is movably guided on an outer cylindrical surface 43 of the ring gear 19, and an inner part of the flange portion 42 is intended to be abuttingly engaged by the rear end of the sleeve member 39. A number of magnets 44 are mounted in a common plane and in a circle at the rear end of the forward housing section 12, and are arranged to generate an attraction force on the flange portion 42 of the activation element 40.

In the rear housing section 13, there is mounted a shut-off switch 46 which is arranged to be activated by the activation element 40. Preferably, the shut-off switch 46 is of the non-contact Hall-element type which is triggered by the mere presence of the sleeve portion 41 of the activation element 40.

In operation of the nut runner, during the initial running down phase of a screw joint tightening process, the torque delivered by the motor 10 via the output spindle 17 is transferred through the reduction gearing stages 14, 20 and the coupling member 24 to the driving clutch half 25. Then, the torque is transferred via the balls 31 and the thrust element 30 to the output shaft 28 and further to the screw joint being tightened via the screw bit attachment 29.

Initially, the reaction torque from the screw joint is low enough not to make the balls 31 climb the slanted walls of the pockets 35, 36 in the thrust element 30 and the driving clutch half 25, respectively, against the bias load of the spring 32. At this stage of the tightening process, which is illustrated in FIG. 2a, the activation element 40 occupies its inactive position in which it is drawn against the end of the sleeve member 39 by the magnets 44.

As the reaction torque from the screw joint has increased to a certain level, the cramming action between the slanted walls of the pockets 35, 36 and the balls 31 will make the thrust element 30 move axially (to the right in FIGS. 2a–c) against the bias load of spring 32. This results in a subsequent movement of the sleeve member 39 as well as the activation element 40 under the action of the magnets 44 until the activation element 40 gets into contact with the magnets 44. This position is illustrated in FIG. 2b.

At continued rotation of the driving clutch half 25, each one of the balls 31 will climb up the slanted walls of the pockets 35, 36 in the driving clutch half 25 and the thrust element 30 and pass an apex before falling into the next pockets, in a way common to this type of clutch. However, when the balls 31 fall into the next pockets, the thrust element 30 is accelerated very abruptly by the force of the spring 32. This means that the thrust element 30, the sleeve member 39 and the activation element 40 are abruptly accelerated as well, and when the thrust element 30 and the sleeve member 39 are stopped as the balls 31 reach the bottoms of the new pockets, the activation element 40 will continue its movement, to the left in FIGS. 2a–c, as a result of its inertia, i.e. the kinetic energy gained during the return movement of the thrust element 30.

Figure 2A:
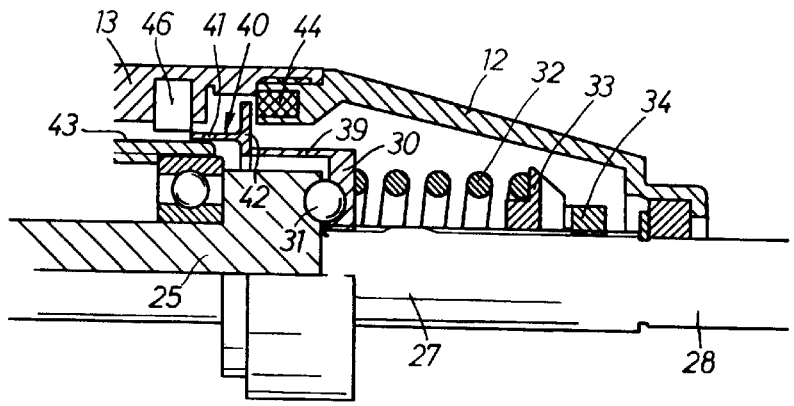
FIG. 2a shows schematically and on a larger scale a longitudinal section through the torque release clutch and shut-off initiating mechanism of the power tool in FIG. 1 and illustrates the mechanism in a low torque condition.
Figure 2B:
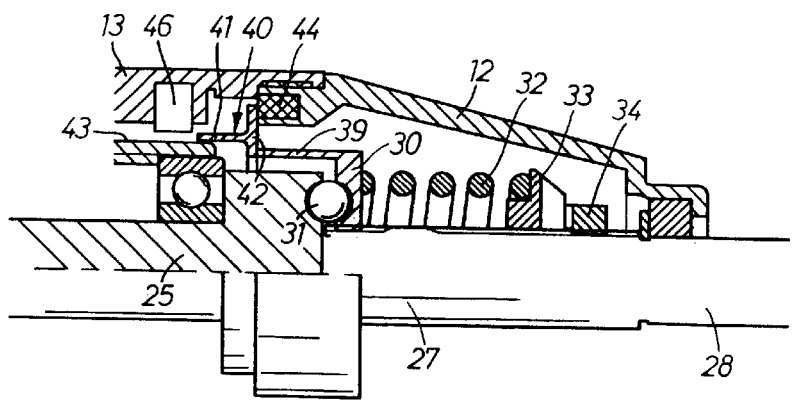
FIG. 2b illustrates the mechanism in FIG. 2a in a release position.
Figure 2C:
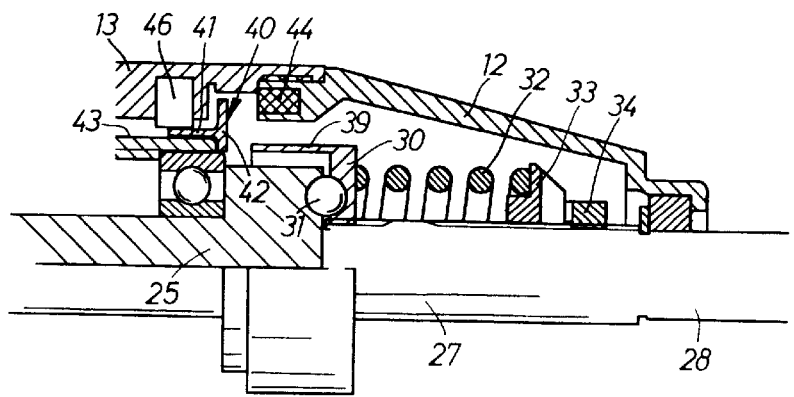
FIG. 2c illustrates the mechanism in FIG. 2a in a shut-off initiating position.

Now, the activation element 40 will reach its active position, beyond its inactive low torque position as shown in FIG. 2a, such that the sleeve portion 41 gets into a position opposite the sensor 46, thereby making the latter deliver a signal for initiating shut-off of the motor 10. See FIG. 2c.

After having been thrown backwards to its active switch triggering position, the activation element 40 returns immediately to its inactive position, as shown in FIG. 2a, by the attraction force of the magnets 44. In this position the activation element 40 re-assumes its abutting engagement with the sleeve member 39.

By arranging the activation element 40 freely movable in the re-engagement direction of the clutch there is obtained a distinct and extended activation movement of the activation element 40 such that the triggering of the shutoff initiating switch 46 distinctly and safely indicates that the clutch has been released and that the intended torque level has been obtained.

Although in the above described embodiment of the invention there is used a Hall-type switch for accomplishing a contact-less activation, the invention is not limited to this type of switch. However, a contact-less activation is preferred because it does not suffer from mechanical wear.

The invention is also not limited to the use of magnets for biassing the activation element 40 towards the inactive position of the latter. Alternatively, some type of spring may be used. Magnets are preferred though, because they are not exposed to fatigue stresses.

What is claimed is:

1. Power nut runner with a torque responsive power shut-off capacity, comprising:
   a housing,
   a rotation motor,
   an output shaft, and
   a torque responsive override clutch for transferring torque from the motor to the output shaft,
   wherein said clutch includes a driving clutch half, a driven clutch half, and a cam mechanism for transferring torque between the driving clutch half and the driven clutch half,
   wherein a first one of the clutch halves is axially movable by the cam mechanism in a release direction from an engagement position to a release position, and a spring is arranged to bias and displace said first clutch half towards said engagement position,
   wherein a clutch release detecting device is provided which is co-operative with said first clutch half, said clutch release detecting device comprising a contact free signal emitting sensor supported in the housing, a separate activation element axially movable between an inactive position and an active position in which it cooperates with the sensor, and a bias force delivering device for urging the activation element towards an abutting engagement with said first clutch half to occupy the inactive position as said first clutch half occupies its engagement position,
   wherein an abutment shoulder is arranged in the housing so as to limit displacement of the activation element in the release direction of said first clutch half,
   wherein the activation element is arranged to be biased by a continuously acting bias force toward the abutment shoulder, and
   wherein the activation element is arranged to follow said first clutch half by action of said bias force in the release direction until contacting the abutment shoulder and to be hit and accelerated by said first clutch half as said first clutch half returns towards its engagement position by the force of the spring, whereby the activation element receives an impact effective to cause the activation element to coast by inertial forces to the active position so as to cooperate with the sensor and accomplish a power shut-off initiating signal.

2. Power nut runner according to claim 1, wherein the activation element comprises a cylindrical sleeve for co-operation with the sensor.

3. Power nut runner according to claim 1, wherein said activation element is cylindrical in shape, and said first clutch half has a tubular contact portion for abutting engagement with the activation element.

4. Power nut runner according to claim 1, wherein the sensor comprises a Hall-element type switch which co-operates in a contactless manner with the activation element.

5. Power nut runner according to claim 1, wherein the rotation motor is an electric motor, and an electric power control unit is connected to the motor as well as to the sensor for interrupting power supply to the motor when receiving a signal from the sensor at release of the clutch.

6. Power nut runner according to claim 1, wherein the activation element comprises a cylindrical sleeve for co-operation with the sensor.

7. Power nut runner according to claim 1, wherein said activation element is cylindrical in shape, and said first clutch half has a tubular contact portion for abutting engagement with the activation element.

8. Power nut runner according to claim 1, wherein the sensor comprises a Hall-element type switch which co-operates in a contactless manner with the activation element.

9. Power nut runner according to claim 2, wherein the sensor comprises a Hall-element type switch which co-operates in a contactless manner with the activation element.

10. Power nut runner according to claim 3, wherein the sensor comprises a Hall-element type switch which co-operates in a contactless manner with the activation element.

11. Power nut runner according to claim 6, wherein the sensor comprises a Hall-element type switch which co-operates in a contactless manner with the activation element.

12. Power nut runner according to claim 7, wherein the sensor comprises a Hall-element type switch which co-operates in a contactless manner with the activation element.

13. Power nut runner according to claim 1, wherein the rotation motor is an electric motor, and an electric power control unit is connected to the motor as well as to the sensor for interrupting power supply to the motor when receiving a signal from the sensor at release of the clutch.

14. Power nut runner according to claim 2, wherein the rotation motor is an electric motor, and an electric power control unit is connected to the motor as well as to the sensor for interrupting power supply to the motor when receiving a signal from the sensor at release of the clutch.

15. Power nut runner according to claim 3, wherein the rotation motor is an electric motor, and an electric power control unit is connected to the motor as well as to the sensor for interrupting power supply to the motor when receiving a signal from the sensor at release of the clutch.

16. Power nut runner according to claim 4, wherein the rotation motor is an electric motor, and an electric power control unit is connected to the motor as well as to the sensor for interrupting power supply to the motor when receiving a signal from the sensor at release of the clutch.

17. Power nut runner according to claim 6, wherein the rotation motor is an electric motor, and an electric power control unit is connected to the motor as well as to the sensor for interrupting power supply to the motor when receiving a signal from the sensor at release of the clutch.

18. Power nut runner according to claim 7, wherein the rotation motor is an electric motor, and an electric power control unit is connected to the motor as well as to the sensor for interrupting power supply to the motor when receiving a signal from the sensor at release of the clutch.

19. Power nut runner according to claim 8, wherein the rotation motor is an electric motor, and an electric power control unit is connected to the motor as well as to the sensor for interrupting power supply to the motor when receiving a signal from the sensor at release of the clutch.

20. Power nut runner according to claim 9, wherein the rotation motor is an electric motor, and an electric power control unit is connected to the motor as well as to the sensor for interrupting power supply to the motor when receiving a signal from the sensor at release of the clutch.

21. Power nut runner according to claim 10, wherein the rotation motor is an electric motor, and an electric power control unit is connected to the motor as well as to the sensor for interrupting power supply to the motor when receiving a signal from the sensor at release of the clutch.

22. Power nut runner according to claim 11, wherein the rotation motor is an electric motor, and an electric power control unit is connected to the motor as well as to the sensor for interrupting power supply to the motor when receiving a signal from the sensor at release of the clutch.

23. Power nut runner according to claim 12, wherein the rotation motor is an electric motor, and an electric power control unit is connected to the motor as well as to the sensor for interrupting power supply to the motor when receiving a signal from the sensor at release of the clutch.

* * * * *